United States Patent
Garcia Morchon et al.

(10) Patent No.: US 11,991,274 B2
(45) Date of Patent: May 21, 2024

(54) AUTHENTICATED LATTICE-BASED KEY AGREEMENT OR KEY ENCAPSULATION

(71) Applicant: KONINKLIJKE PHILIPS N.V., Eindhoven (NL)

(72) Inventors: Oscar Garcia Morchon, Eindhoven (NL); Ludovicus Marinus Gerardus Maria Tolhuizen, Waalre (NL); Sauvik Bhattacharya, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 227 days.

(21) Appl. No.: 17/617,607

(22) PCT Filed: Jun. 11, 2020

(86) PCT No.: PCT/EP2020/066179
§ 371 (c)(1),
(2) Date: Dec. 9, 2021

(87) PCT Pub. No.: WO2020/254177
PCT Pub. Date: Dec. 24, 2020

(65) Prior Publication Data
US 2022/0231843 A1 Jul. 21, 2022

(30) Foreign Application Priority Data

Jun. 18, 2019 (EP) .................... 19181035

(51) Int. Cl.
*H04L 9/08* (2006.01)
*H04L 9/30* (2006.01)

(52) U.S. Cl.
CPC ......... *H04L 9/0844* (2013.01); *H04L 9/3093* (2013.01)

(58) Field of Classification Search
CPC ............................ H04L 9/0844; H04L 9/3093
See application file for complete search history.

(56) References Cited

U.S. PATENT DOCUMENTS

| | | | | |
|---|---|---|---|---|
| 2003/0123668 A1* | 7/2003 | Lambert | ............... | H04L 9/0844 |
| | | | | 380/277 |
| 2013/0007453 A1* | 1/2013 | Benantar | ............... | H04L 9/3226 |
| | | | | 713/169 |
| 2015/0106622 A1* | 4/2015 | Matsuda | ............... | H04L 9/0844 |
| | | | | 713/168 |

(Continued)

FOREIGN PATENT DOCUMENTS

WO 2017041669 A1 3/2017

OTHER PUBLICATIONS

D. Eastlake et al. "RFC 1750: Randomness Recommendations for Security" Published Dec. 1994 (30 pages) https://www.rfc-editor.org/rfc/pdfrfc/rfc1750.txt.pdf (Year: 1994).*

(Continued)

*Primary Examiner* — Joseph P Hirl
*Assistant Examiner* — Thomas A Gyorfi

(57) ABSTRACT

Some embodiments are directed to a system with a first cryptographic device (10) and second cryptographic device (20). The devices may compute a final seed from a preshared secret known to the devices, and on a pre-seed that exchanged between them. The final seed may be used to derive a common object (a).

30 Claims, 6 Drawing Sheets

(56) References Cited

U.S. PATENT DOCUMENTS

2017/0207917 A1* 7/2017 Davis ...................... H04L 63/06
2018/0343127 A1* 11/2018 Campagna .............. H04L 9/085

OTHER PUBLICATIONS

Dongqing Xu, Debiao He, Kim-Kwang Raymond Choo and Jianhua Chen. "Provably Secure Three-party Password Authenticated Key Exchange Protocol Based on Ring Learning With Error", Cryptology ePrint Archive, Paper 2017/360 (25 pages) (Year: 2017).*

Gao et al "Efficient Implementation of Password Based Authenticated Key Exchange From Rlwe and Post-Quantum TLS" Int. Journal Network Security vol. 20, p. 923-930 (2017).

Bos et al "FRODO: Take Off the Ring !. . . " Computer and Communications Security, Oct. 24, 2016 p. 1006-1018.

Gao et al "Post Quantum Secure Remote Password Protocol From RLWE Problem" International Conf. on Pervasive Computing: p. 99-116 (Feb. 4, 2018).

International Search Report and Written Opinion From PCT/EP2020/066179 dated Dec. 24, 2020.

Basso etl al "SABER: Mod-LWR-BASED KEM" downloaded Dec. 7, 2021 https://www.esat.kuleuven.be/cosic/pqcrypto/saber/.

Bos et al "Crystals—Kyber a CCA—Secure Module Lattice Based KEM" 2017.

Bhattacharya et al "SPKEX: An Optimized Lattice Based Key Exchange" Cryptology e print archive Jul. 18, 2017.

Gao et al "Efficient Implementation of Password-Based Authenticated Key Exchange from RLWE and Post-Quantum TLS" Cryptology e-print archive 2017.

Alkim et al "FRODO KEM Learning with Errors Key Encapsulation" Sep. 30, 2020.

Alkim et al "New Hope Algorithm Specifications and Supporting Documentation" Apr. 10, 2020.

* cited by examiner

AUTHENTICATED LATTICE-BASED KEY AGREEMENT OR KEY ENCAPSULATION

CROSS-REFERENCE TO PRIOR APPLICATIONS

This application is the U.S. National Phase application under 35 U.S.C. § 371 of International Application No. PCT/EP2020/066179, filed on Jun. 11, 2020, which claims the benefit of EP Patent Application No. EP 19181035.7, filed on Jun. 18, 2019. These applications are hereby incorporated by reference herein.

FIELD OF THE INVENTION

The presently disclosed subject matter relates to a first cryptographic device, a second cryptographic device, a first cryptographic method, a second cryptographic method and a computer readable medium.

BACKGROUND OF THE INVENTION

In cryptography, a key-agreement protocol is a protocol whereby two or more parties can agree on such a key. For example, the agreed key may be used to protect further communication between the parties, e.g., to authenticate and/or encrypt the further communication. An attacker who eavesdrops on all communication between the two parties should learn nothing about the key. Yet, while the attacker who sees the same communication learns nothing or little, the parties themselves can derive a shared key.

Practical key agreements protocols were introduced in 1976 when Whitfield Diffie and Martin Hellman introduced the notion of public-key cryptography. They proposed a system for key agreement between two parties which makes use of the apparent difficulty of computing logarithms over a finite field GF(q) with q elements. Using the system, two users can agree on a symmetric key.

Key agreement protocols are useful in many applications where multiple parties communicate, e.g., in application areas such as the internet of things, ad-hoc wireless networks, and the like. Key agreement could be used to protect links between devices. Another example is communication between a reader and an electronic tag, say a card reader and a smart card, or a tag reader and tag, e.g., an RFID tag or an NFC tag.

In order to facilitate secure communication among parties, key agreement protocols are sometimes further subdivided into cryptographic key-exchange (KEX) and cryptographic key-encapsulation (KEM) schemes. Cryptographic key-encapsulation (KEM) schemes use asymmetric cryptography to establish a shared secret among two parties, using a publicly known (e.g., public-key) and a secretly-owned (e.g., secret-key) value for each party.

KEX schemes involve the exchange of public-keys by each party, which are then independently used by the other party along with their own secret-key to calculate the common shared secret. A well-known example of a KEX scheme is the Diffie-Hellman key-exchange, mentioned above, whose security is based on solving the discrete logarithm problem. Typically, both parties can influence the outcome so that neither party can force the choice of key. An interesting feature of some KEX schemes is that the actual final, shared secret is never exchanged between the parties, not even in encrypted form, but is calculated independently by the two parties at each end. This results in a desirable feature known as forward-secrecy, which ensures that even the compromise of a party's long-term secret-key by an attacker in the future would not compromise the secrecy of encrypted message exchanged in the past.

KEM schemes establish a shared secret between two entities or parties using asymmetric cryptography by one party, usually the initiator of the communication, to encrypt using the other party's public-key and transmit a shared secret to the other party, known as the responder, who can then decrypt it using her secret-key and then use it for securely communicating with the initiator party. KEM schemes cannot achieve forward-secrecy, since any attacker that compromises a party's secret-key for a past session and has recorded all messages exchanged between the parties in that session can recover the shared secret for that particular session.

Since the paper of Diffie and Hellman new concerns have been raised. Due to increasing security needs in the Internet of Things, key-exchange schemes need to also achieve high efficiency and a low communication or bandwidth requirements. Furthermore, a key agreement protocol is preferably secure, against classical as well as quantum-capable adversaries.

Moreover, disadvantage of these key agreement protocols is that they do not authenticate the parties. This makes them vulnerable to a man-in-the-middle (MITM) attack. In a Man in the Middle attacks, an attacker may place itself between the first and second party. The attacker can then negotiate a first shared key with the first party and second shared key with the second party. Accordingly, the attacker is able to decrypt everything. Conventionally, both the KEX and KEM type protocols require, e.g., a digital signature to avoid the problem. Signatures are operations which are typically avoided in a light-weight protocol as well.

An approach to address this, is so-called Authenticated key exchange (AKE). AKE protocols can negotiate the key and authenticate the identities of communicating parties simultaneously. A particularly important type of AKE is password-based AKE (PAKE). PAKE utilizes human-memorable passwords (or passphrases) which may be cryptographically insecure to authenticate and negotiate the symmetric session key. In a PAKE, the password may be pre-shared by both parties.

In the paper "Efficient Implementation of Password-Based Authenticated Key Exchange from RLWE and Post-Quantum TLS", by Xinwei Gao, et al., included herein by reference, a post-quantum password-based authenticated key exchange (PAKE) protocol is proposed in FIG. 2 of that paper, called RLWE-PPK.

RLWE-PPK is a protocol between two parties, party i and a party j, that have a pre-shared password, pwd. Each party computes two different hashes from the shared password: $\gamma_1 = H_1(pwd)$ and $\gamma_2 = H_2(pwd)$, which are used to mask and unmask the public keys of the respective parties before and after they are transmitted to the other party. To compute the shared key each party needs to compute a further hash, bringing the total number of hashes to three per party. RLWE-PPK is a two-pass implicitly authenticated key protocol. Implicit authentication means that no explicit confirmation of authentication may be computed but if the authentication fails, the parties do not obtain the same key, this in turn protects the communication from disclosure to the unauthenticated party.

The known protocol has several disadvantages. For example, it requires that three hashes are computed for each key agreement. For resource constraint devices this is a burden. Furthermore, the known protocol requires that the public keys remain secret, since the password hashes can be computed from knowledge of the public keys and eavesdropped communication.

SUMMARY OF THE INVENTION

It would be advantageous to have devices and/or methods with improved authenticated key-agreement. Cryptographic devices and methods are set out herein and are claimed that aim to address these and other concerns.

Existing key agreement protocols, even if quantum secure, are typically not authenticated, neither implicit nor explicit. It would be advantageous if existing key agreement protocols may be extended to be authenticated key agreement protocols. An authenticated key agreement protocol is more suited to be used in a real-world scenario in which two parties need to verify the communication channel.

The presently disclosed subject matter includes a first cryptographic device, a second cryptographic device, a first cryptographic method, a second cryptographic method and a computer readable medium. The first and second cryptographic device may be configured to compute a final seed from a pre-shared secret, e.g., a password, and form a pre-seed exchanged between the devices. The final seed may be used to compute a common object, which in turn may be used to compute public keys, e.g., to perform a key agreement protocol.

Embodiments help to avoid a man in the middle attack. Since the first cryptographic device (also referred to as the first party) and the second cryptographic device (also referred to as the second party) have a pre-shared secret, they can derive the common object from which the public keys may be derived. An attacker does not have access to the password and thus cannot compute the common object. Accordingly, he is not able to place himself in the communication between the parties, since the common object is needed to perform the correct computations. Interestingly, the strength of the password is mostly relevant for the strength of the authentication; the strength of the derived shared key may be unaffected. In particular, a key agreement protocol according to an embodiment may be as strong, e.g., quantum resistant, as without authentication.

Embodiments may furthermore be implemented efficiently. For example, in an embodiment, parties may compute as little as a single hash function, e.g., to compute a final seed. Explicit authentication may be obtained if desired without asymmetric digital signatures. Furthermore, it is not required that public keys are secret. Note, that all or most NIST Post-Quantum Cryptography (PQC) lattice-based candidates may be adapted for authentication according to an embodiment.

In an embodiment, the pre-seed may be communicated in the plain over a communication channel, while the preshared secret is not communicated over said channel or not in the plain. For example, the communication channel may also be used for other data exchanged between the devices in the key agreement protocol.

Aspects of the presently disclosed subject matter include cryptographic methods.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

Another aspect of the presently disclosed subject matter provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments will be described, by way of example, with reference to the drawings. Elements in the figures are illustrated for simplicity and clarity and have not necessarily been drawn to scale. In the Figures, elements which correspond to elements already described may have the same reference numerals. In the drawings, FIG. 1 schematically shows an example of an embodiment of a KEX protocol FIG. 2 schematically shows an example of an embodiment of a KEM protocol, FIG. 3 schematically shows an example of an embodiment of a protocol, FIG. 4 schematically shows an example of a cryptographic system according to an embodiment, FIG. 5a schematically shows an example of a cryptographic method according to an embodiment, FIG. 5b schematically shows an example of a cryptographic method according to an embodiment, FIG. 6a schematically shows a computer readable medium having a writable part comprising a computer program according to an embodiment, FIG. 6b schematically shows a representation of a processor system according to an embodiment.

LIST OF REFERENCE NUMERALS 10 a first cryptographic device
20 a second cryptographic device
10.1-10.3 cryptographic operations
11.1 cryptographic message
20.1-20.2 cryptographic operations
21.1, 21.2 cryptographic message
13 out-of-bound communication
14-15 a key agreement protocol
16-17 messages
31 enrollment phase
32 key agreement phase
33 use phase
300 a first cryptographic device
301 a cryptographic system
305 a communication interface
315 a public/private key generator
325 a raw key generator
335 a reconciliation unit
340 a decapsulation unit
350 a second cryptographic device
355 a communication interface
360 a public key obtainer 365 a public/private key generator
375 a raw key generator
385 a reconciliation data generator
390 an encapsulator
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF THE EMBODIMENTS

Figure 1:
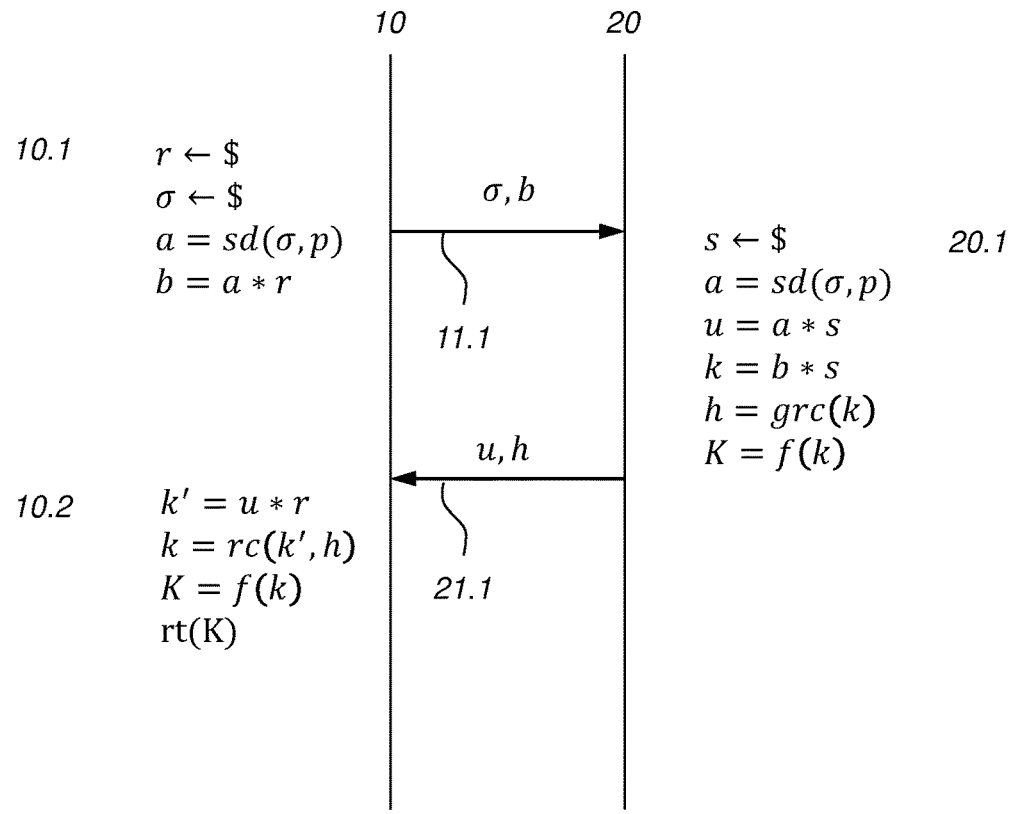

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the presently disclosed subject matter is not limited to the embodiments, as features described herein or recited in mutually different dependent claims may be combined.

Figure 2:
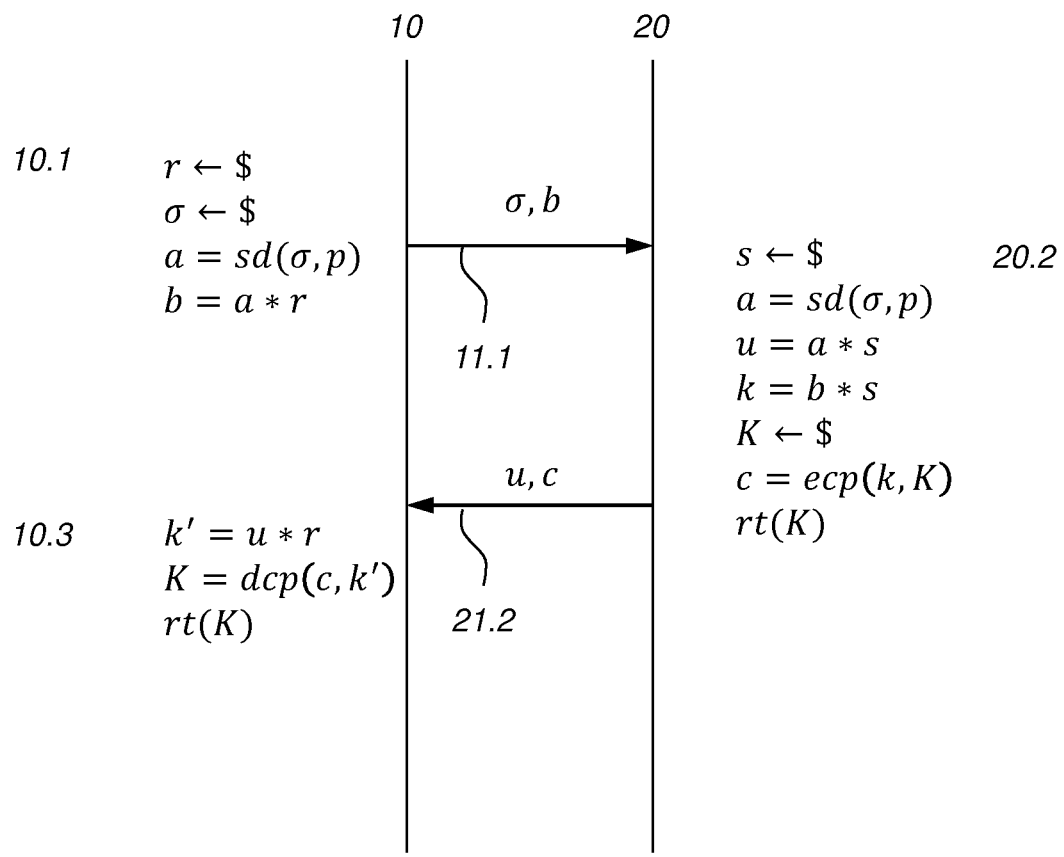
Figure 3:
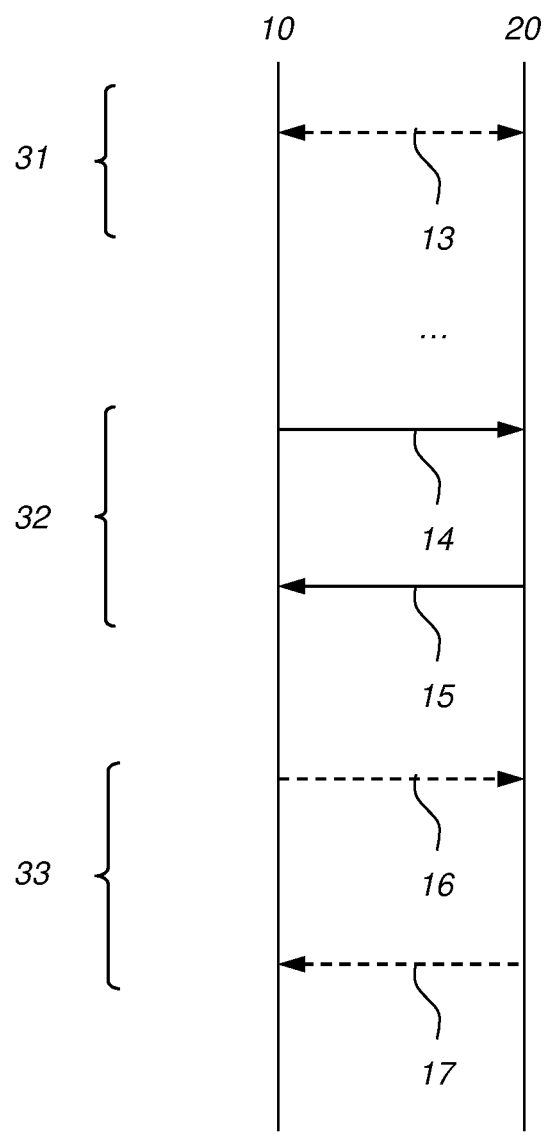

Below various embodiments are disclosed. In FIGS. 1-3 various protocols are described for which a first cryptographic device 10 and a second cryptographic device 20 may be configured. In particular, the first cryptographic device 10 and the second cryptographic device 20 may be arranged for a key agreement protocol, in particular for an authenticated key agreement protocol, more particularly for a password authenticated key agreement protocol, or Password Authenticated Key Exchange (PAKE).

Embodiments may be based on a so-called noisy multiplication. For example, to derive a public key from a private key, the first cryptographic device 10 and the second cryptographic device 20 may be configured to multiply a common object (a) with a private-key to obtain a public-key using a noisy multiplication. Many examples of noisy-multiplications are known, e.g., as used in such cryptographic key agreement protocols such as Round5, Saber, Kyber, NewHope, and Frodo. These are examples of lattice-based key exchanges and/or key encapsulation mechanism that allow two parties to agree on a common key. In those schemes, a parameter a which conventionally is public may be used to obtain the public-key components b and u from secrets r and s of device 10 and device 20, respectively. At least two variants of key agreement may be used: A KEX protocol and a KEM protocol. In FIGS. 1-2 the following notation is used:

a represents a common object that is known to the first cryptographic device 10 and the second cryptographic device 20. For example, the common object may be, e.g., a polynomial in a given ring, e.g., the ring used in RLWE or RLWR, or a matrix with integer entries, e.g., the matrices used in LWE or LWR, or a matrix with polynomial entries, r and s represent the secrets of the parties, e.g., of devices 10 and 20.

b and u represent the public keys, or public key shares of the parties. For example, obtained as the noisy product of a*r or a*s. The *-operation may represent a noisy multiplication. The noisy multiplication may be the one-way function of the underlying cryptographic problem, for example, (R)LWE or (R)LWR or a module version of them, etc.

For example, when referring to LWR a*r, may be implemented as Round((Ar (mod q)), p, q). This may be, the product of r, being a vector of length n, times an n×n square matrix A modulo q. Then the result is rounded with integers p and q where p<q by performing p/q (Ar) (mod q).

c represents encapsulated data h represents helper data, including reconciliation bits The function sd is configured to produce a final seed $\tau$ from its inputs, and to generate the common object a from the final seed $\tau$.

The function grc is function to generate reconciliation data for its input. For example, function grc(k) may be configured to return reconciliation bits out of a raw key k. The function grc may also be referred to as get reconciliation(k).

The function rc is a function to reconcile a raw key using reconciliation data. For example, rc(k', h) may be a function that reconciles a raw key k given reconciliation bits h. The function rc may also be referred to as reconciliate(k', h).

The function ecp is a function to encapsulate data using a raw key. For example, ecp(k, K) may mean that the transmission key K is encapsulated with raw key k. For example, an encapsulation function may mask a key K using a key k such that an error in k has a limited effect on m, e.g., a linear effect. For example, if k is an element, e.g., vector, matrix or polynomial, over $Z_q$, then key K may be represented in $Z_q$ too. Encapsulation may be done component-wise, e.g., c=k+K·(q/2) (mod q). The modulus q may be even and in a particular may be a power of two. The transmission key K may be a key which may be used as the outcome of the key agreement protocol. For example, the transmission key may be used to protect further messages that follow between the parties. Further protection may be authentication, and/or encryption of further messages.

The function dcp is a function to decapsulate encapsulated data, For example, the dcp(c, k') may be decapsulate the data c using raw key k' and returning, e.g., a bit string K. The function dcp may also be referred to as decapsulate(c,k'). For example, to decapsulate one may subtract k' and round to the nearest multiple of q/2.

In an embodiment, additional information that is specific to the parties, is used to derive the final seed $\tau$, this information is referred to as contextual information. The contextual information may comprise secret information p, e.g., secret for untrusted parties, e.g., parties other than the first cryptographic device 10 and the second cryptographic device 20, or parties other than the first cryptographic device 10 and the second cryptographic device 20 and a number of trusted parties, such as a manufacturer. Contextual information may be non-secret, e.g., public. Using contextual information to derive a final seed improves the assurance on the authenticity and freshness of their communication channel. A distinction is made between non-secret information which is shared in the key agreement protocol, e.g., a pre-seed σ and further information z which although not secret is not shared in the key agreement protocol itself. Examples of further information z include network configuration data, public random beacons, etc.

For example, to obtain a Password-Authenticated Key Exchange (PAKE), the parties may share a secret p, e.g., password, e.g., a PIN. The parties may compute the parameter a used for their communication link as a=drbg(hash(σ, p)), wherein σ is a pre-seed, also referred to as a public seed, e.g., a seed which may be exchanged during the protocol, even in plain. The pre-seed may be used as an input to derive a final seed τ from. The common object may be derived from the final seed τ.

With this construction, the parties will establish a secure connection if they share the same p, which is at least implicitly authenticated. The exchanged public components b and u do not give information about p since also s and r are secret. Especially, if s and r are randomly selected may there be a high assurance that b and u do not give information about p. Note that the security of the link does not depend on the amount of entropy in p, e.g., in the PIN, since the confidentiality assurance in key K does not depend on the secrecy of the common object. Advantages of this approach include: (i) fewer hashes need to be computed to obtain a PAKE and (ii) easier integration into existing NIST PQC proposals that compute a common object a from a seed, e.g., as a=drbg(seed). The integration may comprise changing the way the seed is obtained.

For example, in an embodiment, the parties are configured to

Obtain a public pre-seed a. For example, the first party may generate the pre-seed, e.g., by generating it using a random number generator. The first party may send the pre-seed to the second party. In this sense, the pre-seed may be regarded as public, in that it may be shared without cryptographic protection.

Obtain a context-dependent input, for example, a secret p, e.g., a password, and/or further information z, from which the final seed τ may be computed, e.g., τ=Hash (σ|p), e.g., τ=Hash(σ|p|z), etc., wherein hash( ) denotes a hash function and | denotes concatenation. The final seed τ is used to obtain the common object a at each of the two parties. For example, a context-dependent common object, e.g., may be applied by applying a drbg, e.g., a deterministic random bit generator, or an PRNG, etc., e.g., a=drbg(τ).

Interestingly, a common object may be used that is context dependent, e.g., is specific for the current key-agreement. This may be used to provide implicit authentication, e.g., when a pre-shared secret is used. This may be used to increase resistance against man in the middle attacks. This may be used to increase resistance against pre-computation attacks on the common object.

Many noisy multiplications are known in many different fields or rings. For example, a noisy multiplication may be implemented by performing a true multiplication and adding a source of noise. For example, the noise may be explicit noise, e.g., generated from a noise source, or implicit noise, e.g., by rounding the result. For example, to round a multiplication modulo q one may scale from mod q elements to mod p elements, wherein p<q, e.g., multiply with p/q and round the result. Various choices are possible for rounding the result, e.g., rounding down, up, to the nearest integer, rounding may include adding a value, e.g., to reduce bias, etc. The source of noise may also or instead comprise adding explicit noise to the multiplication result, e.g., Gaussian noise.

For example, the first and second public-keys, first and second private-keys, the first and second raw keys, and the common object may be a matrix or vectors over a finite field or ring. For example, the first and second public-keys, first and second private-keys, the first and second raw keys, and the common object may be a polynomial over a finite field or ring.

By binding the common object a in a key agreement protocol to contextual information shared by the parties, channel authentication may be introduced into standard KEX and KEM protocols such as Round5, Kyber, Frodo, etc. Channel authentication helps to avoid MitM or impersonation attacks.

Note that in an embodiment, the parameter a used by the parties may be secret. This is different from conventional key agreement protocols in which the common object is typically a public parameter. Advantageously this further reduces the information available to an attacker that wants to break the cryptographic system.

FIG. 1 schematically shows an example of an embodiment of a KEX protocol. In FIGS. 1-3 time increases from the top to the bottom of the figure.

The KEX in FIG. 1 allows the first party and the second party to agree on a key. This key has low failure probability since the first party and the second party exchange a number of reconciliation bits.

FIG. 1 shows a first cryptographic device 10 configured to communicate with a second cryptographic device 20. First cryptographic device 10 is configured to perform cryptographic operations 10.1

Cryptographic operations 10.1 of device 10 may comprise selecting a pre-seed a. For example, the pre-seed may be generated randomly. The common object a may be derived in part from the pre-seed. Accordingly, the entropy in the common object may be controlled through the pre-seed; e.g., the common object may be at least as random as the pre-seed. In FIGS. 1 and 2, a random source is notated as $.

Cryptographic operations 10.1 of device 10 may comprise computing a final seed τ from the pre-seed σ and a pre-shared secret p. Computing a final seed τ from two or more inputs, e.g., in this case the pre-seed σ and a pre-shared secret p, may be done using by applying a function, e.g., a seed function, e.g., a hash, a key derivation function, or the like.

For example, the pre-shared secret p may have been pre-shared between the second cryptographic device and the first cryptographic device. For example, the pre-shared secret p may be shared between the devices over an out-of-bound communication channel. For example, the protocol may be configured to communicate between the devices over a first communication channel, e.g., an electronic communication channel, e.g., a wired or wireless communication channel. The pre-shared secret p may be communicated in a different manner, e.g., over a second communication channel, different from the first communication channel.

In an embodiment of the second communication channel, the secret p is pre-programmed in one or both of the first device 10 and second device 20, e.g., by a manufacturer. For example, the secret p may be pre-programmed in one of the first device 10 and second device 20, or generated there. For example, a user may enter the secret through a user interface into the other one of the first and second device. For example, the secret may be shown on a display, or may be visible in an internet browser, or may be shown on a sticker on the device, after which, say, a user, enters, e.g., types, the secret p into the other device, e.g., through a user interface. To compute a final seed τ from multiple inputs, e.g., from pre-seed a and shared secret p, a hash function may be applied, or a key derivation function, etc. The hash function may also be applied to further information z.

Once the final seed has been computed, operations 10.1 may comprise computing a common object a from final seed τ. For example, a deterministic random number generator may be used for this purpose. For example, common object a may be a matrix or a polynomial of which the coefficients are randomly computed from the final seed τ. In FIG. 1, the combination of computing the final seed and generating the common object is combined in the function sd. For example, the function sd may implemented as the combination of a hash and a dbrg, e.g., to combine a pre-seed and other inputs into a final seed, and to derive the common object from the final seed.

In an embodiment, the common object, public and private keys comprise one or more polynomials. The degrees of the polynomials may be, e.g., at least 128, at least 256, at least 512, etc. The coefficients of the common object and/or private keys may be modulo an integer which is at least $2^8$, at least $2^9$, at least $2^{10}$, etc. The coefficients of the private keys may be modulo an integer which is at least $2^5$, at least $2^6$, at least $2^7$, etc.

Operations 10.1 may further comprise obtaining a first private-key r associated with the first cryptographic device.

A private-key, also referred to as secret key, may be randomly selected, e.g., drawn from a random source, as this may increase the security of the protocol, e.g., by further obfuscating the connection between the corresponding public key and the common object. It is however, not necessary that a private-key, such as first private key r is randomly generated for each protocol. In an embodiment, a fresh private key is used by one or both parties to compute a key. It is however, possible, to re-use a private key, e.g., re-used for this particular communication party, or for multiple cryptographic devices with which the protocol may be executed. Various restrictions may be placed on a private key to reduce its size, e.g., the number of non-zero coefficients in a secret key may be restricted. The latter is optional and not needed.

Once the first private key r has been obtained, e.g., generated, e.g., retrieved from a storage, e.g., a local storage of the device, the operation 10.1 comprise computing a first public-key b from the first private-key r. Computing a public-key comprising multiplying the private-key with the common object a, e.g., using a noisy multiplication.

The first public-key b and the pre-seed σ are transferred to the second cryptographic device 20. FIG. 1 shows a communication 11.1 from the first device 10 to the second device 20. Communication 11.1 may comprise the first public-key b and the pre-seed σ.

FIG. 1 shows a second cryptographic device 20 configured to communicate with the first cryptographic device 10. Second cryptographic device 20 may be configured to perform cryptographic operations 20.1

Second cryptographic device 20 is configured to receive the first public-key b and the pre-seed σ which were transferred from the cryptographic device 10. Second cryptographic device 20 is configured to retrieve the shared secret p, e.g., from a storage of device 20, e.g., in the same manner as above.

Operations 20.1 may comprise computing a final seed from the pre-seed a received from the first cryptographic device 10 and from the pre-shared secret p, e.g., by applying the same seed function as device 10. Operations 20.1 may be configured so that device 10 and device 20 arrive at the same final seed τ. Operations 20.1 may comprise computing the same common object a from the final seed. Operations 20.1 may be configured so that device 10 and device 20 arrive at the same common object a.

Note that the common object does not need to be shared over the communication channel, e.g., the first communication channel, between first device 10 and second device 20. Furthermore, the information that is shared, e.g., σ, b is not sufficient to compute the common object. This means that an eavesdropper does not know the common object that was used.

Operations 20.1 may comprise obtaining a second private-key (s) associated with the second cryptographic device. As device 10, there are the same options to obtain this, e.g., generate, e.g., randomly generate it, e.g., retrieve it, etc. The first public-key b associated with the first cryptographic device is obtained from the first device 10, e.g., received.

Operations 20.1 may comprise computing a second public-key u from the second private-key s. The second private-key s may be computed in the same manner as the first public-key b, e.g., computing the second public-key u may comprise multiplying the second private-key s with the common object a.

Operations 20.1 may comprise computing a second raw shared key k, sometimes denotes as k* from the first public-key b and the second private-key s. Computing the second raw shared key may comprise a multiplication between the second private-key s and the first public-key b, this may be the same type of multiplication but does not have to be a noisy multiplication.

The second public-key u is sent to the first device 10. With the second public-key u, first device 10 may compute a first raw key that is nearly the same as the second raw key. Sometimes, the first and second raw key may be equal, though they also may not be. To reduce the potential differences between the first and second raw key various elements may be added to the protocol. For example, FIG. 1 shows an example in which reconciliation is used.

For example, in an embodiment operations 20.1 may comprise generating reconciliation data h for at least part of the coefficients of the raw shared key. The reconciliation data h may comprise information that allows reducing of differences between the first raw key and the second raw key derived at the first and second device, respectively.

Finally, operations 20.1 may comprise generating a transmission key K from the second raw shared key k*. This may include applying a hash function.

The second public key u and the reconciliation data h are transferred to the first device 10. FIG. 1 shows a communication 21.1. For example, communication 21.1 may comprise the second public key u and the reconciliation data h.

First cryptographic device 10 is configured to receive the second public-key u and the reconciliation data h which were transferred from the second cryptographic device 20. First cryptographic device 10 may be configured to perform cryptographic operations 10.2

Cryptographic operations 10.2 of device 10 may comprise computing a first raw shared key k' from the second public-key u and the first private-key r. This may be done in the same manner as at the second device 20, but with the different keys, e.g., computing the first raw shared key may comprise a multiplication between the second public-key (u)

and the first private-key (r). The result is that the first and second raw keys are likely to be close to each other.

Cryptographic operations 10.2 of device 10 may comprise applying the reconciliation data h in a reconciliation function to at least part of the coefficients in the first raw shared key k'. The result of this is that the reconciled first raw key is likely equal to the second raw key. The same transmission key K may now be obtained from the reconciled first raw shared key (k'). If only part of the coefficients of the raw key are reconciled, then the first and second device may use the reconciled coefficient to compute the transmission key and may ignore the unreconciled coefficients. There remains a small change that the two device will not arrive at the same transmission key, but this probability can be managed, and reduced if needed.

The cryptographic operations 10.1, 20.1 and 10.2 may be performed in that order.

A possible way to compute reconciliation data is explained in a patent application of the same applicant, with title "REACHING AGREEMENT ON A SECRET VALUE", filed at the EPO on 4 Nov. 2016, with application Ser. No. 16/197,277.3; for example, the method on pages 7-10 may be used for reconciliation in embodiments. Variants disclosed elsewhere in the cited patent application may also be adopted. In this application, the following notation is adapted for the following three functions:

1. Rounding Function $\lfloor \cdot \rceil_{B,p_h}$ : For $q, b_h, B \in Z, b_h \geq 1, B < \log_2 q - b_h$, let $\bar{B} = \log_2 q - B$. Then, $\lfloor \cdot \rceil_{B,p_h} : v \to \lfloor 2^{-\bar{B}} \cdot v \rceil (\mathrm{mod} 2^B)$ Intuitively, $\lfloor v \rceil_{B,b_h}$ extracts the B most significant bits of $\{v+2^{\log q-(\bar{B}+b_h)}\}$, where the second component is a rounding factor to ensure unbiased rounding errors. B indicates the number of bits that are extracted form a symbol v, and $b_h$ indicates the number of helper data bits. In an embodiment, q may be a power of 2.

2. Cross-Rounding Function $\langle \cdot \rangle_{B,p_h}$ : For $q, b_h, B \in Z, b_h > 1, B < \log_2 q - b_h$, let $\bar{B} = \log_2 q - B$. Then, $\langle \cdot \rangle_{B,b_h} : v \to \lfloor 2^{-\bar{B}+b_h} \cdot v \rfloor (\mathrm{mod} 2^{b_h})$ Intuitively, $(v)_{B,b_h}$ extracts the $b_h$ least significant bits of the $(B+b_h)$ most significant bits of v.

3. Reconciliation Function rec(w, b)

For $q, b_h, B \in Z, b_h \geq 1, B < \log_2 q - b_h, w \in Z_q, b \in [0, 2^{b_h})$, $rec(w, b) = \lfloor v \rceil_{B,p_h}$ where v is the closest element to w such that $\langle v \rangle_{B,b_h} = b$.

The closest element w may be taken according to the Lee distance, e.g., $\min(|v-w|, q-|v-w|)$.

These three functions can be applied coefficient-wise to polynomials or matrices, etc. The above cited reconciliation function is used as an example, herein. As noted, the reconciliation methods in the above cited application could also be used. The cross-rounding function can be applied to obtain the reconciliation data and the rounding function to obtain the data which is reconciled. When the reconciliation data is later used in the reconciliation function, the reconciled data is recovered. In other words: $rec(w, \langle v \rangle) = \lfloor v \rceil$, assuming that v and w are within a threshold distance of each other.

In an embodiment, the first and second public key, first and second private key and the raw key are multiple polynomials over a finite field or ring, a public key being obtained from a private key by a noisy multiplication with multiple shared polynomials (a). For example, multiple polynomials may be used in module-lattices in which the elements of the lattice are polynomials.

FIG. 2 schematically shows an example of an embodiment of a KEM protocol. The protocols illustrated with FIG. 2 are broadly similar to those of FIG. 1, except that the raw keys are used to encapsulate and in that the probability of differences that may arise between raw keys are reduced in a different manner. An advantage of the protocols of FIG. 2 is that it allows the second party to encapsulate a random key of his own choice given the public key b of the first party. This allows achieving active security.

In an embodiment according to FIG. 1, the first device 10 may first perform cryptographic operation, these may be an embodiment of operation 10.1, shown in FIG. 1. The communication 11.1 from device 10 to device 20 may be the same as in FIG. 1.

FIG. 2 may then follow with cryptographic operations 20.2 after receiving the pre-seed σ and the public key b. Cryptographic operations 20.2 may be the same as operations 20.1 except that no reconciliation data is computed. Instead, operations 20.2 may comprise generating a transmission key K. A difference between FIGS. 1 and 2 is that with FIG. 2 there is control over what the final transmission key will be, e.g., second device 20 may select it. The selection may be a random generation, but may also be the result of a further algorithm.

Instead of reconciliation data, the transmission is encapsulated with at least part of the second raw shared key by applying an encapsulation function, e.g., function ecp, thus obtaining encapsulated data c The encapsulated data c is transferred to the first cryptographic device, e.g., together with the second public key u. For example, second device 20 may send a communication 21.2 to first device 10.

First device 10 may be configured to receive the encapsulated data c which is transferred from the second cryptographic device 20, e.g., together with the second public key u. First device 10 may be configured to perform cryptographic operations 10.3. Operations 10.3 are similar to operations 10.2 except that encapsulation is used instead of reconciliation to reduce the difference between the first and second raw key.

For example, operations 10.3 may comprise decapsulating the encapsulated data c using at least part of the first raw shared key k' to obtain a transmission key K.

In an embodiment, the transmission key K is random, and/or ephemeral and/or symmetric and/or independent from the first public-key (b).

For example, the transmission key K may be generated independent from the first private-key, first public-key, second private-key and second public-key—that is the transmission key K may be independent from the first and second raw key. Note that a raw key does depend on a public and private key. For example, the transmission key may be generated at least in part randomly. An independent key makes it easier to achieve active security. Randomness to compute a key, e.g., a private key or a transmission key may be obtained from a conventional random number generator, preferably a true random number generator.

In an embodiment, the common object and private keys are polynomials of degree n with coefficients modulo q. The public keys may be polynomials of degree n modulo p.

A broad range of parameters are possible, generally restricted in that the resulting key agreement protocol generates a sufficiently large key with a sufficiently low failure-probability is obtained. The latter two parameters can be observed empirically or computed theoretically. Acceptable values depend on the application.

Particular advantageous KEM protocols which may be used in connection with FIG. 2 are described in the NIST proposal "Round5: KEM and PIKE based on (Ring) Learning with Rounding Thursday 28 Mar. 2019", included herein by reference. For example, sections 2.9.5 and 2.9.7 give example parameters suitable for a broad range of situations. For example, the above paper provides examples for encapsulating, error correcting, and other details of a KEM protocol.

For example, a KEM protocol, e.g., as in FIG. 2 may be defined over a cyclotomic ring $Z_q[x]/\Phi_{n+1}(x)$, preferably with n+1 prime, e.g., polynomials of degree n with coefficients modulo q. The reduction polynomial can be arbitrary, but the (n+1)-th cyclotomic polynomial $\Phi_{n+1}(x)=x^n+\ldots+x+1$, may be an efficient choice. The common object A, may be a d/n×d/n matrix with entries in $Z_q[x]/\Phi_{n+1}(x)$. The private keys may be matrices of dimension d/n×n×$\bar{n}$ or d/n× $\bar{m}$.

For example, the following parameters may be used:
d: Number of polynomial coefficients per row of public matrix
n: Degree of reduction polynomial; also indicates if a ring (n>1) or a non-ring (n=1) instantiation is used
h: Number of non-zero polynomial coefficient per column of secret matrices
q, p, t, b: Rounding moduli, e.g., b|t|p|q, e.g., all powers of two, satisfying b<t<p<q
b_bits: Number of extracted bits per symbol in ciphertext component; $=2^{b\_bits}$,
κ: Security parameter; number of information bits in transmission key
$\bar{n}$: Number of columns of the secret matrix of the initiator
$\bar{m}$: Number of columns of the secret matrix of the responder For example, in an embodiment, one may choose: d=618, n=618, h=104, q=$2^{11}$, p=$2^8$, t=$2^4$, b=$2^1$, κ=128, $\bar{n}$=1, $\bar{m}$=1.

To further reduce the error probability, the transmission key may be encoded in a codeword before encapsulating. This may use the following additional parameters.
f: Number of bit errors correctable by error-correcting code
xe: Number of parity bits of error correcting code
μ: Number of symbols in ciphertext component $$\mu = \left\lceil \frac{\kappa + xe}{b\_bits} \right\rceil$$

For example, one may have for the above parameters for the above case: f=0, xe=0, μ=128. In an embodiment, one may have that $\mu \leq \bar{n} \cdot \bar{m} \cdot n$ and $\mu \cdot b\_bits \geq \kappa$ A different instantiation may be, as follows:
d=1186, n=1, h=712, q=$2^{15}$, p=$2^{12}$, t=$2^7$, b=$2^4$, κ=256, $\bar{n}$=8, $\bar{m}$=8, f=0, xe=0, μ=64.
A different instantiation may be, as follows:
d=490, n=490, h=242, q=$2^{10}$, p=$2^7$, t=$2^3$, b=$2^1$, K=128, $\bar{n}$=1, $\bar{m}$=1, f=5, xe=190, μ=318.

Similar parameters as above may be used for protocols according to FIG. 1.

There are various other ways to reduce the distance between the first and second raw keys, which may be employed in addition or instead of those shown in relation to FIGS. 1 and 2. For example, in an embodiment both encapsulation and reconciliation is used. In that case, one may use a reconciled raw key for the encapsulation. For example, before computing reconciliation and/or encapsulation the so-called reliable bits of the second raw key may be selected, e.g., those coefficients of the second raw keys that are most likely to be produce the same bits at the first device 10. Reconciliation and/or encapsulation may then be applied to the selected reliable coefficients. The indices of the reliable coefficients may be communicated from device 20 to device 10, e.g., in communication 21.2.

Below various examples of computing a final seed τ, a pre-seed σ and/or a pre-shared secret p are given. Each of these examples may be incorporated in the various key agreement protocols described herein, in particular those of FIGS. 1 and 2.

For example, in an embodiment, the pre-shared secret may comprise a pre-shared password. For example, the password may be a sequence of alphanumeric characters or a sequence of numeric characters. For example, the pre-shared secret may be obtained through an out-of-band channel.

For example, in an embodiment the pre-seed σ may be sent and received in a plain-format. For example, device 10 may randomly generate the pre-seed σ, and send it in plain format, e.g., un-encrypted to second device 20. Interestingly, the security of the system is not impacted because of this. An attacker cannot obtain the common object a from the pre-seed a alone, and moreover, even if he could, the security of the resulting transmission key K system does not depend on the secrecy of the common object a.

For example, the pre-seed may be sent and received over a communication interface which is installed in the first device 10 and the second device 20, and which is used to exchange the communications, e.g., the messages, of the key agreement protocol and/or for subsequent communications that may be exchanged between them and which may be protected with the transmission key. In an embodiment, the pre-seed is not sent through those communication interfaces.

For example, the final seed τ may depend on further information than the pre-seed and the pre-shared secret. For example, the further information may be included in a hash or key derivation function. For example, the final seed may be further computed from network configuration data from a network connection between the second cryptographic device and the first cryptographic device. Even if the network configuration data is public data it still helps to mitigate MitM or impersonation attacks, since an attacker will need to keep track of the further information.

For example, further information may comprise a network address of the first and/or second cryptographic device. An example, of a network address is an IP address or a MAC address.

For example, further information z may comprise a purpose of the network connection. For example, the purpose of the network connection may be to perform communication for a particular application. The name of the application may be included in the further communication. The purpose of the connection may be derived, from the information that was derived earlier. For example, a network port address may be used to derive the purpose. A network port may also itself be part of the further information. For example, the key agreement protocol may be performed because of a further algorithm which is to be performed thereafter; and indication of the further algorithm may be used as further information to compute the final seed, and may later be verified to see if the further algorithm is indeed used or to refuse algorithms that are not consistent with the further information.

For example, the further information z may comprise a time of day, possibly including the current date. For example, the first and second device may first execute a synchronization protocol to synchronize their time, after which the synchronized time may be used as further information. For example, the current date may be comprised in the further information.

For example, the further information z may comprise an interaction counter. The interaction counter may be maintained by the second cryptographic device 20 and the first cryptographic device 10. For example, the interaction counter may be increased at least whenever a shared key is derived.

Thus further resistance against attacks may be achieved by deriving the final seed $\tau$ from three sources: pre-seed $\sigma$ which may be shared, e.g., in communication 11.1, a pre-shared secret p, and further information. Indeed, advantageous protocols with different properties are also obtained by deriving the final seed $\tau$ from another selection of two sources, e.g.: pre-seed $\sigma$ and further information z, or, e.g., a pre-shared secret p, and further information.

Network configuration data used in the further information may be from a current network connection between the first cryptographic device and the second cryptographic device, and/or the network configuration data used in the further information may be from a previous network connection between the first cryptographic device and the second cryptographic device.

For example, in an embodiment, a successful key agreement is obtained if the pre-shared secret matches. For example, shared secret p may be a PIN or a pre-shared key (PSK). If the parties know the pre-shared secret, e.g., the PIN or the PSK, then they are both able to derive final seed $\tau$, and from there the common object a. For example, $\tau$=Hash(p|$\sigma$), and a=drbg($\tau$). Once a final seed $\tau$ is obtained, a known KEX or KEM protocol using a seed can follow as usual. If an attack is going on, e.g., MitM, or impersonation, the KEX or KEM protocol will not lead to a shared symmetric-key or allow for proper decapsulation. The later regular usage of the established key will implicitly determine whether both parties, shared the same secret p. The implicit authentication may be converted into explicit authentication. For example, communication 11.1 may comprise a challenge, and communication 21.1 or 21.2 may comprise the corresponding response. For example, the challenge may be a nonce, and the response may be an encryption with the transmission key. After deriving the transmission key, device 10 may verify the response, and thus learn if device 20 has a secret p that matches his own. The challenge may also be implicit, for example, the challenge may be a predetermined string.

The messages in FIGS. 1 and 2 or later messages may comprise message authentication codes or message authentication tags. If they can be verified correctly, the implicit authentication can be transformed to explicit authentication. If they cannot be verified correctly, then the implicit lack of authentication can be transformed to an explicit lack of authentication.

It is noted that even if a short shared secret is used, e.g., a PIN with 4 numbers having only 10000 possible values, then this construction ensures that the PIN cannot be easily brute forced. The reason is that even if the number of secret values p is limited (10000), this value does not go over the wire so that an attacker cannot derive the used PIN. The values exchanged over the wire, the public-key components b and u are obtained by multiplying common object a with s and r. These public-key components cannot be easily linked back to the shared secret since both s and r are secrets themselves. By contrast, in conventional algorithm a hash of the password may go over the wire, which could directly lead to a leak of the password if the entropy of the password is low. Another advantage is that neither party learns the shared secret of the other party. The reason is that the common object cannot be derived from knowledge of the public key.

In an embodiment, the final seed $\tau$ is derived from further information z, possibly in addition to the pre-seed $\sigma$ and pre-shared secret p. This construction may be used in the setup of a secure connection between the parties, e.g., using a networking protocol such as IPSec. For example, in an embodiment, the parties may establish connections on a regular basis then the further information may comprise, e.g.:

Information about the current exchange including (1) current IP address of the first party; (2) purpose of the IP connection, e.g., which other protocols will be used later; (3) time of the day;

Information about previous exchanges, e.g.: (1) when was the last time in which a key exchanged happen; (2) purpose of the exchange; This information may be public, but it does mean that an attacker may have to keep track of the state between the two parties, if he to successfully impersonate them in an impersonation or MitM attack.

A random number from a random number beacon, e.g., the NIST random beacon. If the last disclosed random number of the beacon is used in the further information, then the second party knows that this is a fresh handshake, and not a replay.

Information about the current connection, e.g., an IP address. Then the corresponding party binds the key exchange to that specific IP address. This avoids mix and match attacks in which parts of a communication are re-used in a different context.

Information about later protocols—that the first party intends to use—is included, then the second party can check early whether the purpose is suitable. The ability to do an early check means that DOS attacks are harder.

Information about previous key exchanges. This forces potential attacks to keep track of those previous exchanges to break the protocol.

Interestingly, when a pre-shared secret p is used an attacker cannot recover the secret context p given the public components b and u. Indeed, if the space of p is large, e.g., the size of the security parameter, then the security is equivalent to finding the pre-image of the output of the hash function. Thus, if a secure hash function is used, the system is secure. However, even if the secret p has only a limited number of states, in an extreme case, just 2 possible states, then security is still equivalent to the following problem: Given public $(a_1, a_2, b)$=(hash($\sigma$, m), hash($\sigma$, 1−m), m·$A_1$*s+(1−m)·$A_2$*s) with public seeds, secret m=0 or 1, and secret s, find out m, or in other words, find out whether $a_1$ or $a_2$ was used. In this problem, $A_1$ and $A_2$ are the common objects that can be derived in a known manner from the seed, e.g., we may use $A_1=sd(\sigma, m)$, etc.

The LWE/R assumption states that it is difficult to distinguish (A, b=A*s) from uniform random. In the above problem, both ($A_1$, b=$A_1$*s) and ($A_2$, b=$A_2$*s) are LWE/R samples difficult to distinguish from uniform, and thus, from each other.

FIG. 3 schematically shows an example of an embodiment of a protocol between first device 10 and second device 20.

Shown in FIG. 3 is an out-of-bound communication 13 to share a pre-shared secret p. Out-of-bound communication 13 may be done during an enrollment phase 31 of device 10 and 20. For example, out-of-bound communication 13 may be performed during manufacture of the device, e.g., to enable them for later communication. For example, out-of-bound communication 13 may be performed partly during manufacture of the device, e.g., to enable it for later communication. The other on of the device may be provided with the pre-shared secret later. For example, out-of-bound communication may be performed by a user, e.g., manually through a user interface on one or both of the devices. For example, a pre-shared secret may be set on one of the device, say device 20, by representing the secret by setting switches of the device, for example, dip switches, or through another interface. The secret may be generated on the other one device and set on the other.

In a later key agreement phase 32, first device 10 and second device 20 perform a key agreement protocol according to an embodiment, e.g., an embodiment as described herein, e.g., with respect to FIG. 1 or 2. In the key agreement protocol two messages may be exchanged: key agreement protocol message 14 and key agreement protocol message 15, e.g., as described herein. There may be more messages in a key agreement protocol. In the key agreement protocol, the pre-shared secret p may be used.

At the end of the key agreement phase 32, the two devices may have a transmission key K which is at least implicitly authenticated with respect to secret p. If the devices 10 and 20 do not have the same shared then, at least in most cases, transmission keys K that are derived at the two devices will be different.

In an embodiment enrollment phase 31 and key agreement phase 32 use a different communication channel, e.g., a different communication medium, but they may use different frequencies, or a different frequencies band.

During a later use phase 33, the transmission key that is agreed on during the key agreement phase may be used. For example, messages may be exchanged between device 10 and 20 which are cryptographically protected using transmission key K, e.g., a message may be encrypted with key K or comprise an authentication tag, e.g., a MAC, computed with key K, or both. A message may also be protected with a key that is derived from key K. FIG. 3 shows two message 16 and 17 but there may be more than 2 messages, e.g., 4 or more, etc., or one message, etc. The messages may be in a different order.

For example, device 20 may be configured to encrypt a message m with the transmission key K, and to transfer said encrypted message to the first cryptographic device 10, or vice versa. Device 10 may be configured to decrypt the message using the transmission key K.

The transmission key is a key that is derived from the raw shared key. For example, the transmission key may be independent of the raw shared key, e.g., in a KEM protocol. In an embodiment, the key used to encrypt may be the hash of the transmission key and public key. For example, the public key of the recipient. One may also hash with the public key of the sender, or with both. For example, the transmission key may be derived directly from the raw shared key, e.g., by hashing it. In an embodiment, the key used to encrypt may be the hash of the raw key and public key.

During the key agreement phase 32 or the use phase 33 the implicit authentication may be converted into explicit authentication. For example, challenge response protocol may be done using the transmission key, e.g., using the transmission key directly or a key derived therefrom.

Interestingly, the challenge-response protocol may be implicit. For example during use phase 33, a message may be authenticated as part of the protection. If the authentication fails this may imply that the message was tampered with or that the pre-shared secret p did not match between the devices. In both cases, the communication cannot be trusted and suitable action may be taken. Suitable action when detecting a problem may include, e.g., aborting communication, starting a new key-agreement protocol, sending a warning message, e.g., an e-mail, an alarm, etc.

For example during use phase 33, a message may be encrypted as part of the protection. If the message contains a predictable part, e.g., a pre-determined string, a header, e.g., a counter, etc., then the predictable part may be verified after decryption. If the predictable part fails to match the prediction after decryption, then it may be concluded that the message was tampered with or that the pre-shared secret p did not match between the devices. Suitable action may be undertaken in this case.

An interesting application is provisioning a device, e.g., with network configuration data. For example, consider a device configured to perform network communication. For example, consider a device configured to configure the device for network communication. For example, in an embodiment the device configured to perform network communication may be device 20 and the configuration device may be device 10, though it may be the other way around. The configuration device may be a smart phone, laptop, computer, etc.

For example, for the enrollment phase 31, device 20 may be provided with a pre-shared secret. The pre-shared secret is communicated out-of-bound to device 10. For example, the pre-shared secret may be provided on the outside of the device, and entered by the user, or scanned, e.g., in the form of scanning a QR-code, bar code, etc. When the pre-shared secret is available in device 10, e.g., through a suitable interface, e.g., a user interface, a scanning interface. For example, the pre-shared secret may be shared using NFC or Bluetooth. For example, the exchange may be initiated by pressing a button on device 10 and/or 20. For example, the pre-shared secret may be randomly generated on device 10 and/or 20.

During the key agreement phase 32, device 10 and 20 use the pre-shared secret to agree on a transmission key K. For example, the key agreement phase may use a different communication channel, e.g., Wi-Fi.

During the use phase 33, device 10 may send network configuration data protected, e.g., encrypted, using the transmission key to device 20. For example, the transmission may use the same communication channel as the key agreement phase 32, e.g., Wi-Fi, etc. After receiving the network configuration data, device 20 may send and receive data over a computer network using the network configuration data. The network configuration data may comprise a network key, a certificate, a network address, etc. Encrypting a message, e.g., network configuration data, with the transmission key, includes direct encryption with the transmission key as well as indirect encryption wherein a further key is derived from the transmission key which is used to directly encrypt the message. For example, device 20 may be a router. A protocol such as the one above may also be used to configure lighting elements, e.g., luminaires.

Interestingly, embodiments may provide a more secure transmission key than using, say, the pre-shared secret to protect communication directly. Even if the entropy in the pre-shared secret is low, then still the transmission key provided by an embodiment can have high entropy.

For example, a pair of Bluetooth devices may be coupled to establish a secure and authenticated communication link. The link is secure in terms of the confidentiality strength achieved as provided by the key agreement protocol, and authenticated since both of them use the same pre-shared secret.

An embodiment may also be used to address impersonation attacks. For example, in a conventional protocol, e.g., in which the common object is fixed or shared as part of the protocol, an attacker could replay messages from one side. It may take a long time before the second party notices that something is amiss. However, when the second party receives messages, then that party may want to ensure that the incoming messages are really from a particular source. In an embodiment, this can be achieved by including a varying element in the messages. For example, the second party may include a challenge, e.g., a nonce in a message, e.g., in message 21.1 or 21.2., and send it to the other side for encryption or authentication with the transmission key.

Figure 4:
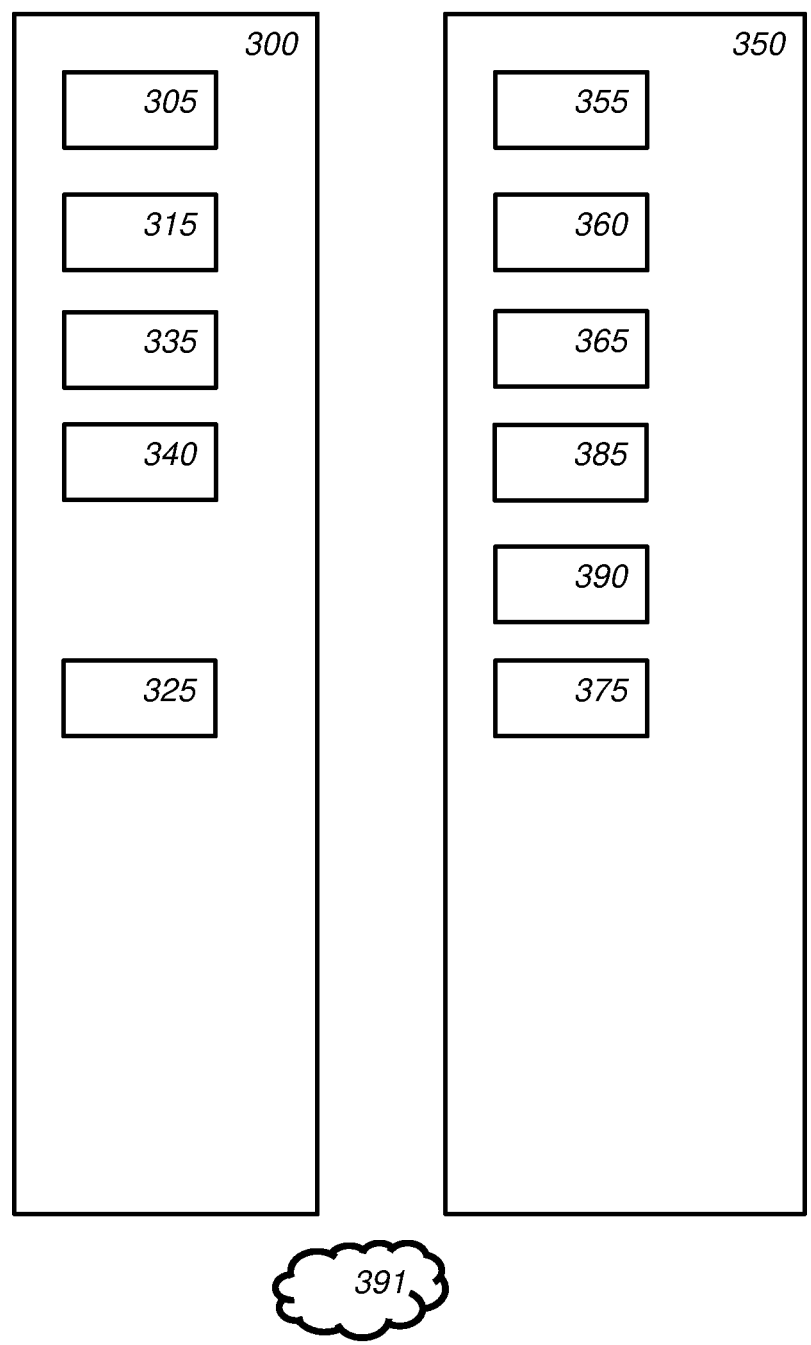

FIG. 4 schematically shows an example of a cryptographic system 301 according to an embodiment. System 301 comprises a first cryptographic device 300, a second cryptographic device 350. For example, the first device 300 and second device 350 on a device such as first device 300 and/or second device 350. For example, devices 300 may be configured as device 10, and device 350 may be configured as device 20.

First and second device 300 and 350 are configured to perform a cryptographic protocol. They have the ability to pass data from one device to the other.

For example, the first and second device may be configured for a key agreement protocol, e.g., designed to generate a key, typically a symmetric key, that is shared between the two devices. The shared key may then be used by the devices for protected communication, e.g., encrypted and/or authenticated communication, e.g., by using the key for encryption of messages and/or for computing an authentication tag for a message.

In an embodiment, device 300 and device 350 may each store a pre-shared secret p. For example, device 300 and device 350 may comprise a pre-shared secret unit (not separately shown) to obtain and/or store the pre-shared secret.

First device 300, second device 350 may comprise one or more of a storage interface, a processor, and a memory respectively. The first device 300, and second device 350, e.g., the various devices of system 301 may communicate with each other over a computer network 391. The computer network may be an internet, an intranet, a LAN, a WLAN, etc. Computer network 391 may be the Internet. The computer network may be wholly or partly wired, and/or wholly or partly wireless. For example, the computer network may comprise Ethernet connections. For example, the computer network may comprise wireless connections, such as Wi-Fi, ZigBee, and the like. The devices comprise a connection interface which is arranged to communicate with other devices of system 301 as needed. For example, the connection interface may comprise a connector, e.g., a wired connector, e.g., an Ethernet connector, or a wireless connector, e.g., an antenna, e.g., a Wi-Fi, 4G or 5G antenna. For example, first device 300, and second device 350 may comprise communication interface 305, 355 respectively. Computer network 391 may comprise additional elements, e.g., a router, a hub, etc.

The execution of the first device 300, and second device 350 may be implemented in a processor, e.g., a processor circuit, examples of which are shown herein. The first device 300, in particular the processor of first device 300 may implement the functions of the first party 10. The second device 350, in particular the processor of second device 350 may implement the functions of the second party 20. For example, these functions may be wholly or partially be implemented in computer instructions that are stored at device 300, or 350, e.g., in an electronic memory of the device, and are executable by a microprocessor of the device. In hybrid embodiments, functional units are implemented partially in hardware, e.g., as coprocessors, e.g., crypto coprocessors, and partially in software stored and executed on device 300, or 350.

Devices 300, and 350 may comprise a storage interface to store and/or retrieve messages, possibly encrypted messages. For example, the storage interface may be implemented locally, e.g., as an interface to a memory comprised in the device, e.g., in a memory of the respective device. The storage interface may also interface with offline, e.g., non-local, storage, e.g., cloud storage, e.g., a storage such as a memory or a drive located in another device. If cloud storage is used the devices may comprise a local storage as well, e.g., a memory. For example, the memory may be used to store computer programming instructions, temporary storage of files and the like.

In the various embodiments of devices 300 and 350, the communication interface may be selected from various alternatives. For example, the interface may be a network interface to a local or wide area network, e.g., the Internet, a storage interface to an internal or external data storage, an application interface (API), etc.

The devices 300 and 350 may have a user interface, which may include well-known elements such as one or more buttons, a keyboard, display, touch screen, etc. The user interface may be arranged for accommodating user interaction for initiating a key agreement protocol, responding to a key agreement protocol, sending an encrypted message, etc. Storage may be implemented as an electronic memory, say a flash memory, or magnetic memory, say hard disk or the like. Storage may comprise multiple discrete memories together making up storage. Storage may also be a temporary memory, say a RAM.

Typically, the devices 300 and 350 each comprise a microprocessor which executes appropriate software stored at the devices 300 and 350; for example, that software may have been downloaded and/or stored in a corresponding memory, e.g., a volatile memory such as RAM or a non-volatile memory such as Flash. Alternatively, the devices 300 and 350 may, in whole or in part, be implemented in programmable logic, e.g., as field-programmable gate array (FPGA). Devices 300 and 350 may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL etc.

In an embodiment, devices 300 and 350 may comprise one or more circuits to implement one or more or all of the functions of the respective device. The circuits may implement the corresponding functions described herein. The circuits may be a processor circuit and storage circuit, the processor circuit executing instructions represented electronically in the storage circuits.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only. The circuits may also be, FPGA, ASIC or the like.

First device 300 may comprise a public/private key generator 315 configured to generate a first private key (r) and a first public key (b) derived from the first private key. Deriving the public key from the private key may use a common object (a). For example, generating the public key may involve multiplication with the common object, and/or introducing a type of noise, e.g., scaling down the multiplication result, adding a noise term, etc. The private key and common object may be a polynomial or a matrix, e.g., over a finite field or ring.

First device 300 and second device 350 are configured to agree on a common object a. For example, first device 300 and second device 350 may be configured to exchange data from which a final seed may be computed, e.g., one or more pre-seeds a, sent to and/or from the first device 300 and second device 350. For example, first device 300 and second device 350 may be configured to maintain public data from which the final seed may also be computed, e.g., counters, network data, etc. For example, first device 300 and second device 350 may be configured to store secret data, e.g., a pre-shared secret p. For example, first device 300 and second device 350 may be configured to obtain common data, e.g., from a random number beacon. For one or more of these sources the devices compute a common final seed $\tau$. For an attacker to arrive at the same final seed $\tau$, he needs access or keep track of same sources. Device 300 and 350 are configured to derive the common object a from the common final seed. Nota that the common object that is used for key agreement not known to the attacker.

The first private and public key may be generated ephemerally. For example, the latter may be done for a key agreement protocol, especially, if the first and second device use another authentication mechanism, e.g., an out-of-band mechanism, e.g., certificate based authentication or the like, to authenticate each other.

The first public key is transferred from the first device 300 to the second device 350, e.g., through communication interfaces 305 and 355. This may be done by direct communication. Together with the first public key, also the pre-seed $\sigma$ may also be transferred, if needed. For example, by sending the pre-seed $\sigma$ the final seed from which the common object (a) may be generated can be calculated.

Second device 350 may comprise a public key obtainer 360. The public key may also be obtained directly from the first device, possibly out-of-bound, e.g., in an email. The public key may be stored until needed. However, the first public key may also be received for immediate use, e.g., for a key sharing operation, e.g., in this case the first public key and/or common object, may be ephemerally generated.

Second device 350 may comprise a public/private key generator 365 configured to generate a second private key (s) and to generate a second public key (u) from the second private key (s). The second public key uses the same common object as generating the first public key did. The first and second private keys are private to their respective devices. They may be shared with trusted parties if needed, e.g., for back-up, key escrow, etc. The public keys, and the common object are not necessarily secret for security; nevertheless one or more of them may still be private to first and second device if desired. For example, the first public key may only be shared with the second device, and vice versa.

Independent generation may be obtained, e.g., in case of a message, if the message is generated from an application that is independent from the public key encryption, e.g., a financial or communication application, etc. Independent generation may be obtained, e.g., by random generation.

Second device 350 may comprise a raw key generator 375. Raw key generator 375 is configured to generate a second raw shared key (k*) from the first public key (b) and the second private key (s). For example, the raw key generator 375 may be configured to apply a noisy multiplication to the first public key and the second private key. For example, the noisy multiplication may be multiplication or exponentiation depending on the underlying mechanism. Second device 350 is configured to transfer its second public key to the first device 300.

First device 300 may comprise a raw key generator 325. Raw key generator 325 is configured to generate a first raw shared key (k') from the second public key (u) and the first private key ($\tau$), e.g., by applying a noisy multiplication. Unfortunately, for with noisy multiplications it may happen that the first and second raw keys are close to each other, though not necessarily identical. The particular likelihood of this happening depends on the underlying noisy multiplication. Some likelihood of different raw keys may be accepted in most applications, however, how high this likelihood may be will depend on the application. Typically though, a lower likelihood will be preferred. The raw key may be of the same mathematical type, e.g., polynomial or matrix, as the private and public keys.

Reconciliation data generator 385 is configured to generate reconciliation data (h) for the indicated coefficients of the raw shared key. The reconciliation data comprising information allowing reducing of differences between the first and second raw key derived at the first and second device. For example, applying reconciliation data may cause the difference, e.g., the Lee distance, between a coefficient of the raw keys at the first and second device to be reduced, thus increasing the probability that both will produce the same bit. The reconciliation data may be computed over coefficients in a raw shared key.

One way to implement reconciliation data is take one or more, say $b_h$, bits of a coefficients that follow the bits taken as the key bits. For example, these may be the $b_h$ bits that follow the B bits in significance. For example, the number of reconciliation bits per selected coefficients may be, say, 1, or 2. A smaller number of reconciliation bits has the advantage of reducing communication overhead. A larger amount of reconciliation bits is possible though.

Second device 350 may comprise an encapsulator 390. Encapsulator 390 is configured to encapsulate the key K with the key bits by applying an encapsulation function, e.g., an XOR. The encapsulation may be one-time pad encapsulation. For example, an XOR function may be used, on one of the other encapsulation functions described herein.

The second device is configured to transfer the second public key (u), the reconciliation data (h) and/or the encapsulated data (c). The transferring may be in response to receiving the first public key, e.g., in case of key agreement, or not, e.g., in case of public key encryption.

The first device 300 is configured to receive from the second device a second public key (u), reconciliation data (h), and/or encapsulated data (c). First device 300 may comprise a reconciliation unit 335 configured to apply the reconciliation data (h) in a reconciliation function to the coefficients in the first raw shared key (k'), obtaining key bits (k). For example, a coefficient may be reconciled using the reconciliation bits and then sampled to obtain a reliable bit. First device 300 comprises a decapsulation unit 340 configured to decapsulate the encapsulated data (c) obtaining the key K. In an embodiment, device 300 and device 350 comprise only one of a reconciliation and encapsulation/decapsulation unit. In an embodiment, device 300 and device 350 comprise other ways of reducing the distance between the raw keys.

Figures 5A, 5B:
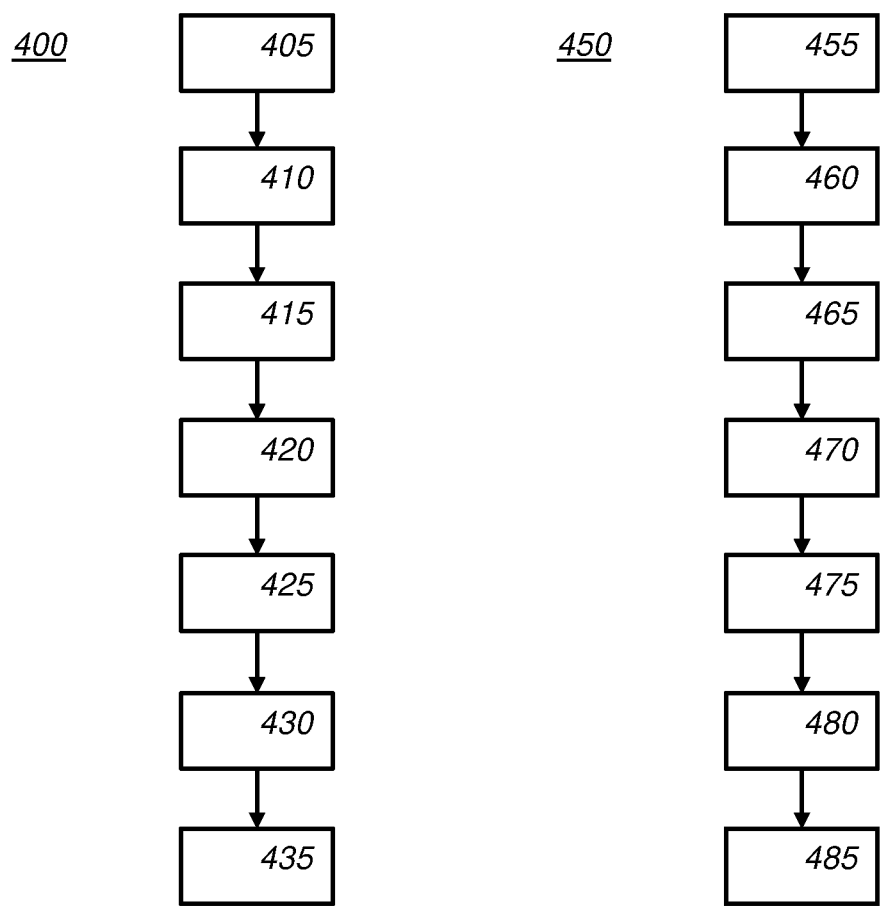

FIG. 5*a* schematically shows an example of a cryptographic method 400 according to an embodiment. For example, method 400 may be used together with method 450. For example, methods 400 and 450 may be extended or changed according to embodiments described herein. Second cryptographic method (400) may comprise communicating (405) with a first cryptographic device (10),
computing (410) a final seed from
a pre-seed received from the first cryptographic device (10), and
a pre-shared secret, said secret being pre-shared between the second cryptographic device and the first cryptographic device,
computing (415) a common object (a) from the final seed,
obtaining (420) a first public-key (b) associated with the first cryptographic device, and obtaining a second private-key (s) associated with the second cryptographic device,
computing (425) a second public-key (u) from the second private-key (s), computing the second public-key (u) comprising multiplying the second private-key (s) with the common object (a),
computing (430) a second raw shared key (k*) from the first public-key (b) and the second private-key (s), computing the second raw shared key comprising a multiplication between the second private-key (s) and the first public-key (b),
transferring (435) the second public-key (u) to the first device.

FIG. 5*b* schematically shows an example of a cryptographic method 450 according to an embodiment. First cryptographic method (450) may comprise communicating (455) with a second cryptographic device (20),
selecting (460) a pre-seed and sending the pre-seed to the second cryptographic device (20)
computing (465) a final seed from the pre-seed and the pre-shared secret, said secret being pre-shared between the second cryptographic device and the first cryptographic device,
computing (470) a common object (a) from the final seed,
obtaining (475) a first private-key (r) associated with the first cryptographic device and compute a first public-key (b) from the first private-key (r), computing the first public-key (b) comprising multiplying the first private-key (r) with the common object (a), and transfer of the first public-key (b) to the second cryptographic device,
receiving (480) from the second cryptographic device a second public-key (u)
computing (485) a first raw shared key (k') from the second public-key (u) and the first private-key (r), computing the first raw shared key comprising a multiplication between the second public-key (u) and the first private-key (r).

For example, methods 400 and 450 may be computer implemented methods. For example, computing parts of the methods may be computed with a computer, a calculating circuit, etc. For example, communicating with a cryptographic device may be done using a communication interface. For example, storing or retrieving parameters, keys and the like may be done from an electronic storage, e.g., a memory, a hard drive, etc. The keys and/or common object may be represented in data which is larger than 10 bytes, 50 bytes, 100 bytes, etc.

Many different ways of executing the method are possible, as will be apparent to a person skilled in the art. For example, the steps can be performed in the shown order, but the order of the steps may also be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

Embodiments of the method may be executed using software, which comprises instructions for causing a processor system to perform method 400 and/or 450. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units, and/or parts of at least one of the systems and/or products set forth.

Figure 6A:
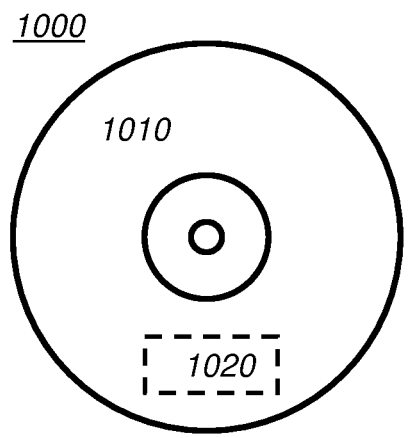

FIG. 6*a* shows a computer readable medium 1000 having a writable part 1010 comprising a computer program 1020, the computer program 1020 comprising instructions for causing a processor system to perform a cryptographic method, according to an embodiment. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said cryptographic method.

Figure 6B:
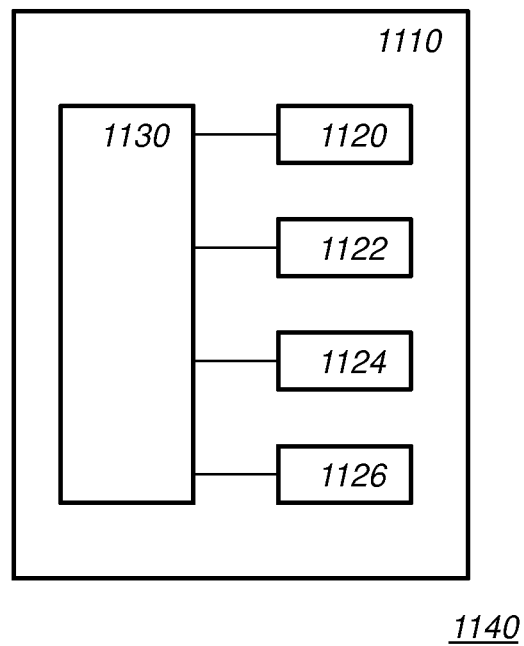

FIG. 6b shows in a schematic representation of a processor system 1140 according to an embodiment of a cryptographic device. The processor system comprises one or more integrated circuits 1110. The architecture of the one or more integrated circuits 1110 is schematically shown in FIG. 6b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the cryptographic device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

While device 1140 is shown as including one of each described component, the various components may be duplicated in various embodiments. For example, processing unit 1120, e.g., processor 1120, may include multiple microprocessors that are configured to independently execute the methods described herein or are configured to perform steps or subroutines of the methods described herein such that the multiple processors cooperate to achieve the functionality described herein. Further, where the device 1140 is implemented in a cloud computing system, the various hardware components may belong to separate physical systems. For example, the processor 1120 may include a first processor in a first server and a second processor in a second server.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

The following numbered clauses include examples that are contemplated and nonlimiting:

Clause 1. A second cryptographic device (20) comprising
   a communication interface configured to communicate with a first cryptographic device (10),
   a processor configured to
     compute a final seed from
       a pre-seed received from the first cryptographic device (10), and
       a pre-shared secret, said secret being pre-shared between the second cryptographic device and the first cryptographic device,
     compute a common object (a) from the final seed,
     obtain a first public-key (b) associated with the first cryptographic device, and obtain a second private-key (s) associated with the second cryptographic device,
     compute a second public-key (u) from the second private-key (s), computing the second public-key (u) comprising multiplying the second private-key (s) with the common object (a),
     compute a second raw shared key (k*) from the first public-key (b) and the second private-key (s), computing the second raw shared key comprising a multiplication between the second private-key (s) and the first public-key (b),
     transfer the second public-key (u) to the first device.

Clause 2. A first cryptographic device (10) comprising
   a communication interface configured to communicate with a second cryptographic device (20),
   a processor configured to
     select a pre-seed and send the pre-seed to the second cryptographic device (20)
     compute a final seed from
       the pre-seed and the pre-shared secret, said secret being pre-shared between the second cryptographic device and the first cryptographic device,
     compute a common object (a) from the final seed,
     obtain a first private-key (r) associated with the first cryptographic device and compute a first public-key (b) from the first private-key (r), computing the first public-key (b) comprising multiplying the first private-key (r) with the common object (a), and transfer of the first public-key (b) to the second cryptographic device,
     receive from the second cryptographic device a second public-key (u)
     compute a first raw shared key (k') from the second public-key (u) and the first private-key (r), computing the first raw shared key comprising a multiplication between the second public-key (u) and the first private-key (r).

Clause 3. A second cryptographic device (20) or a first cryptographic device (10) as in any one of the preceding clauses, wherein the pre-shared secret comprises a pre-shared password.

Clause 4. A second cryptographic device (20) or a first cryptographic device (10) as in any one of the preceding clauses, wherein the pre-seed is sent and received in plain-format.

Clause 5. A second cryptographic device (20) or a first cryptographic device (10) as in any one of the preceding clauses, wherein the pre-seed is sent and received over the communication interface but the pre-shared secret is not sent and received over the communication interface.

Clause 6. A second cryptographic device (20) or a first cryptographic device (10) as in any one of the preceding clauses, wherein the final seed is further computed from network configuration data from a network connection between the second cryptographic device and the first cryptographic device.

Clause 7. A second cryptographic device (20) or a first cryptographic device (10) as any one of the preceding clauses, wherein the final seed is computed from
- a network address of the first and/or second cryptographic device,
- a purpose of the network connection,
- a time of day,
- a interaction counter, the interaction counter being maintained by the second cryptographic device (20) and the first cryptographic device (10) and is increased at least whenever a shared key is derived.

Clause 8. A second cryptographic device (20) or a first cryptographic device (10) as in any one of the preceding clauses, wherein
the processor of the second cryptographic device (20) is configured to
generate a transmission key (K),
encapsulate the transmission key (K) with at least part of the second raw shared key by applying an encapsulation function, obtaining encapsulated data (c),
transfer the encapsulated data (c) to the first cryptographic device, and
the processor of the first cryptographic device (10) is configured to
receive from the second device encapsulated data (c),
decapsulate the encapsulated data (c) using at least part of the first raw shared key (k') to obtain a transmission key.

Clause 9. A second cryptographic device (20) or a first cryptographic device (10) as in any one of the preceding clauses, wherein
the processor of the second cryptographic device (20) is configured to
generate reconciliation data (h) for at least part of the coefficients of the raw shared key, the reconciliation data comprising information allowing reducing of differences between a first raw key and the second raw key derived at the first and second device,
generate a transmission key (K) from the second raw shared key (k*),
transfer the reconciliation data (h) to the first device, and
the processor of the first cryptographic device (10) is configured to
receive reconciliation data (h) from the second device,
apply the reconciliation data (h) in a reconciliation function to at least part of the coefficients in the first raw shared key (k')
generate a transmission key (K) from the reconciled first raw shared key (k').

Clause 10. A second cryptographic device (20) or a first cryptographic device (10) as in any one of the preceding clauses, wherein the multiplication with the common object (a) in computing the first public-key (b) and the second public-key (u) is a noisy multiplication.

Clause 11. A second cryptographic device or first cryptographic device as in any one of the preceding clauses, wherein
the processor of the second cryptographic device is configured to encrypt a message (m) with the transmission key, and to transfer said encrypted message to the first cryptographic device, the processor of the first cryptographic device is configured to decrypt the encrypted message with the transmission key, and to verify the message (m), and/or
the processor of the first cryptographic device is configured to encrypt a message (m) with the transmission key, and to transfer said encrypted message to the second cryptographic device, the processor of the second cryptographic device is configured to decrypt the encrypted message with the transmission key, and to verify the message (m).

Clause 12. A second cryptographic device or first cryptographic device as in any one of the preceding clauses wherein the transmission key is random, and/or ephemeral and/or symmetric and/or independent from the first public-key (b).

Clause 13. A second cryptographic device or first cryptographic device as in any one of the preceding clauses, wherein
the first and second public-keys, first and second private-keys, the first and second raw keys, and the common object are a matrix over a finite field or ring
the first and second public-keys, first and second private-keys, the first and second raw keys, and the common object are a polynomial over a finite field or ring.

Clause 14. A second cryptographic device or first cryptographic device as in any one of the preceding clauses, wherein network configuration data is sent encrypted with the transmission key.

Clause 15. A second cryptographic method (400) comprising
communicating (405) with a first cryptographic device (10),
computing (410) a final seed from
a pre-seed received from the first cryptographic device (10), and
a pre-shared secret, said secret being pre-shared between the second cryptographic device and the first cryptographic device,
computing (415) a common object (a) from the final seed,
obtaining (420) a first public-key (b) associated with the first cryptographic device, and obtaining a second private-key (s) associated with the second cryptographic device,
computing (425) a second public-key (u) from the second private-key (s), computing the second public-key (u) comprising multiplying the second private-key (s) with the common object (a),
computing (430) a second raw shared key (k*) from the first public-key (b) and the second private-key (s), computing the second raw shared key comprising a multiplication between the second private-key (s) and the first public-key (b),
transferring (435) the second public-key (u) to the first device.

Clause 16. A first cryptographic method (450) comprising
communicating (455) with a second cryptographic device (20),
selecting (460) a pre-seed and sending the pre-seed to the second cryptographic device (20)

computing (465) a final seed from the pre-seed and the pre-shared secret, said secret being pre-shared between the second cryptographic device and the first cryptographic device, computing (470) a common object (a) from the final seed, obtaining (475) a first private-key (r) associated with the first cryptographic device and compute a first public-key (b) from the first private-key (r), computing the first public-key (b) comprising multiplying the first private-key (r) with the common object (a), and transfer of the first public-key (b) to the second cryptographic device, receiving (480) from the second cryptographic device a second public-key (u)

computing (485) a first raw shared key (k') from the second public-key (u) and the first private-key (r), computing the first raw shared key comprising a multiplication between the second public-key (u) and the first private-key (r).

Clause 17. A transitory or non-transitory computer readable medium (1000) comprising data (1020) representing instructions, which when executed by a processor system, cause the processor system to perform the method according to clause 15 and/or 16.

In the claims references in parentheses refer to reference signs in drawings of exemplifying embodiments or to formulas of embodiments, thus increasing the intelligibility of the claim. These references shall not be construed as limiting the claim.

The invention claimed is:

1. A second cryptographic device comprising:
   a communication interface circuit, wherein the communication interface circuit is arranged to communicate with a first cryptographic device using a lattice-based key exchange or a lattice-based key encapsulation key agreement protocol; and
   a processor circuit,
   wherein the processor circuit is arranged to compute a final seed from a pre-seed and a pre-shared secret,
      wherein the pre-seed is received from the first cryptographic device,
      wherein the pre-shared secret is pre-shared between the second cryptographic device and the first cryptographic device,
   wherein the processor circuit is arranged to compute a common object from the final seed using a deterministic random bit generator or a pseudorandom number generator,
   wherein the processor circuit is arranged to obtain a first public-key and a second public-key,
      wherein the first public-key is associated with the first cryptographic device,
      wherein the second public-key is associated with the second cryptographic device,
      wherein the first public-key is computed at the first cryptographic device,
      wherein the computation comprises a first multiplication between the common object and a first private-key of the first cryptographic device,
   wherein the processor circuit is arranged to compute a second public-key from the second private-key,
      wherein computing the second public-key comprises multiplying the second private-key with the common object,
   wherein the processor circuit is arranged to compute a second raw key from the first public-key and the second private-key,
      wherein computing the second raw key comprises a second multiplication between the second private-key and the first public-key,
   wherein the processor circuit is arranged to transfer the second public-key to the first device.

2. The second cryptographic device as in claim 1, wherein the pre-shared secret comprises a pre-shared password.

3. The second cryptographic device as in claim 1, wherein the pre-seed is received in plain-format.

4. The second cryptographic device as in claim 1,
   wherein the pre-seed is received over the communication interface circuit,
   wherein the pre-shared secret is not received over the communication interface circuit.

5. The second cryptographic device as in claim 1,
   wherein the computation of the final seed comprises network configuration data,
   wherein the network configuration data is from a network connection between the second cryptographic device and the first cryptographic device.

6. The second cryptographic device as in claim 1,
   wherein the processor circuit is arranged to generate a transmission key,
   wherein the processor circuit is arranged to encapsulate the transmission key with at least a portion of the second raw key by applying an encapsulation function so as to obtain encapsulated data,
   wherein the processor circuit is arranged to transfer the encapsulated data to the first cryptographic device,
   wherein the first cryptographic device is arranged to receive the encapsulated data,
   wherein the first cryptographic device is arranged to decapsulate the encapsulated data using at least a portion of a first raw key so as to obtain a transmission key.

7. The second cryptographic device as in claim 1,
   wherein a first raw key comprises coefficients,
   wherein the processor circuit is arranged to generate reconciliation data for at least a portion of the coefficients,
      wherein the reconciliation data comprises information,
      wherein the information allows reduction of differences between a first raw key and the second raw key,
      wherein the first raw key is derived on first cryptographic device,
   wherein the processor circuit is arranged to generate a transmission key from the second raw key,
   wherein the processor circuit is arranged to transfer the reconciliation data to the first cryptographic device,
   wherein the first cryptographic device is arranged to receive the reconciliation data,
   wherein the first cryptographic device is arranged to apply the reconciliation data in a reconciliation function to at least a portion of coefficients so as to create a reconciled first raw key,
   wherein first cryptographic device is arranged to generate a transmission key from the reconciled first raw key.

8. The second cryptographic device as in claim 1, wherein first the multiplication is a noisy multiplication.

9. The second cryptographic device as in claim 1,
   wherein the processor circuit is arranged to encrypt a message with the transmission key,
   wherein the processor circuit is arranged to transfer the encrypted message to the first cryptographic device,
   wherein the first cryptographic device is arranged to decrypt the encrypted message with the transmission key, wherein the first cryptographic device is arranged to verify the message.

10. The second cryptographic device as in claim 1, wherein the transmission key is random, and/or ephemeral and/or symmetric and/or independent from the first public-key.

11. The second cryptographic device as in claim 1, wherein the first public key, the second public-key, the first private-key, second private-key, the first raw key, second raw key, and the common object are embodied as a matrix over a ring.

12. The second cryptographic device as in claim 1, wherein the first public key, the second public-key, the first private-key, second private-key, the first raw key, second raw key, and the common object are embodied as a polynomial over a ring.

13. A second cryptographic device as in claim 1,
wherein the final seed is computed from a network address of the first cryptographic device and/or a network address of the second cryptographic device and/or a purpose of the network connection and/or a time of day and/or an interaction counter,
wherein the interaction counter is maintained by the second cryptographic device and the first cryptographic device,
wherein the interaction counter is increased at least when a shared key is derived.

14. A second cryptographic device as in claim 1,
wherein the first cryptographic device is arranged to encrypt a message with the transmission key,
wherein the first cryptographic device is arranged to transfer the encrypted message to the second cryptographic device,
wherein the processor circuit is arranged to decrypt the encrypted message with the transmission key,
wherein the processor circuit is arranged to verify the message.

15. A first cryptographic device as in claim 1,
wherein the final seed is computed from a network address of the first cryptographic device and/or a network address of the second cryptographic device and/or a purpose of the network connection and/or a time of day and/or an interaction counter,
wherein the interaction counter is maintained by the second cryptographic device and the first cryptographic device,
wherein the interaction counter is increased at least when a shared key is derived.

16. A first cryptographic device comprising
a communication interface circuit, wherein the communication interface circuit is arranged to communicate with a second cryptographic device using a lattice-based key exchange or a lattice-based key encapsulation key agreement protocol; and
a processor circuit,
wherein the processor circuit is arranged to select a pre-seed and to send the pre-seed to the second cryptographic device,
wherein the processor circuit is arranged to compute a final seed from the pre-seed and the pre-shared secret, wherein the pre-shared secret is pre-shared between the second cryptographic device and the first cryptographic device,
wherein the processor circuit is arranged to compute a common object from the final seed using a deterministic random bit generator or a pseudorandom number generator, wherein the processor circuit is arranged to obtain a first private-key and compute a first public-key from the first private-key,
wherein the first private-key is associated with the first cryptographic device,
wherein computing the first public-key comprises multiplying the first private-key with the common object,
wherein the processor circuit is arranged to transfer the first public-key to the second cryptographic device,
wherein the processor circuit is arranged to receive a second public-key from the second cryptographic device,
wherein the processor circuit is arranged to compute a first raw key from the second public-key and the first private-key,
wherein computing the first raw key comprises a first multiplication between the second public-key and the first private-key.

17. A first cryptographic device as in claim 16,
wherein the final seed is computed from a network address of the first cryptographic device and/or a network address of the second cryptographic device and/or a purpose of the network connection and/or a time of day and/or a interaction counter,
wherein the interaction counter is maintained by the second cryptographic device and the first cryptographic device,
wherein the interaction counter is increased at least when a shared key is derived.

18. The first cryptographic device as in claim 16, wherein the pre-shared secret comprises a pre-shared password.

19. The first cryptographic device as in claim 16, wherein the pre-seed is received in plain-format.

20. The first cryptographic device as in claim 16,
wherein the pre-seed is sent over the communication interface circuit,
wherein the pre-shared secret is not sent over the communication interface circuit.

21. The first cryptographic device as in claim 16,
wherein the computation of the final seed comprises network configuration data,
wherein the network configuration data is from a network connection between the second cryptographic device and the first cryptographic device.

22. The first cryptographic device as in claim 16,
wherein the second cryptographic device is arranged to generate a transmission key,
wherein the second cryptographic device is arranged to encapsulate the transmission key with at least a portion of the second raw key by applying an encapsulation function so as to obtain encapsulated data,
wherein the second cryptographic device is arranged to transfer the encapsulated data to the first cryptographic device,
wherein the processor is arranged to receive the encapsulated data,
wherein the processor is arranged to decapsulate the encapsulated data using at least a portion of a first raw key so as to obtain a transmission key.

23. The first cryptographic device as in claim 16,
wherein a first raw key comprises coefficients,
wherein second cryptographic device is arranged to generate reconciliation data for at least a portion of the coefficients, wherein the reconciliation data comprises information,
wherein the information allows reduction of differences between a first raw key and the second raw key,
wherein the first raw key is derived on first cryptographic device,
wherein second cryptographic device is arranged to generate a transmission key from the second raw key,
wherein second cryptographic device is arranged to transfer the reconciliation data to the first cryptographic device, and
wherein the processor is arranged to receive the reconciliation data,
wherein the processor is arranged to apply the reconciliation data in a reconciliation function to at least a portion of coefficients so as to create a reconciled first raw key,
wherein the processor is arranged to generate a transmission key from the reconciled first raw key.

24. The first cryptographic device as in claim 16, wherein first the multiplication is a noisy multiplication.

25. The first cryptographic device as in claim 16,
wherein the second cryptographic device is arranged to encrypt a message with the transmission key,
wherein the second cryptographic device is arranged to transfer the encrypted message to the first cryptographic device,
wherein the processor of is arranged to decrypt the encrypted message with the transmission key,
wherein the processor of is arranged to verify the message.

26. The first cryptographic device as in claim 16,
wherein the processor of is arranged to encrypt a message with the transmission key,
wherein the processor of is arranged to transfer the encrypted message to the second cryptographic device,
wherein the second cryptographic device is arranged to decrypt the encrypted message with the transmission key,
wherein the second cryptographic device is arranged to verify the message.

27. A second cryptographic method comprising:
communicating with a first cryptographic device using a lattice-based key exchange or a lattice-based key encapsulation key agreement protocol;
computing a final seed from a pre-seed and a pre-shared secret,
wherein the pre-seed is received from the first cryptographic device,
wherein the pre-shared secret is pre-shared between the second cryptographic device and the first cryptographic device;
computing a common object from the final seed using a deterministic random bit generator or a pseudorandom number generator;
obtaining a first public-key and a second public-key,
wherein the first public-key is associated with the first cryptographic device,
wherein the second public-key is associated with the second cryptographic device,
wherein the first public-key is computed at the first cryptographic device,
wherein the computation comprises a first multiplication between the common object and a first private-key of the first cryptographic device;
computing a second public-key from the second private-key, wherein computing the second public-key comprises multiplying the second private-key with the common object;
computing a second raw key from the first public-key and the second private-key; and
computing the second raw key, wherein the computing of the second raw key comprises a second multiplication between the second private-key and the first public-key,
transferring the second public-key to the first device.

28. A computer program stored on a non-transitory medium, wherein the computer program when executed on a processor performs the method as claimed in claim 27.

29. A first cryptographic method comprising:
communicating with a second cryptographic device using a lattice-based key exchange or a lattice-based key encapsulation key agreement protocol;
selecting a pre-seed;
sending the pre-seed to the second cryptographic device;
computing a final seed from the pre-seed and the pre-shared secret, wherein secret is pre-shared between the second cryptographic device and the first cryptographic device;
computing a common object from the final seed using a deterministic random bit generator or a pseudorandom number generator;
obtaining a first private-key associated with the first cryptographic device;
computing a first public-key from the first private-key;
computing the first public-key, wherein the computing of the first public key multiplying the first private-key with the common object;
transferring the first public-key to the second cryptographic device;
receiving a second public key from the second cryptographic device;
computing a first raw key from the second public-key and the first private-key, wherein computing the first raw key comprises a first multiplication between the second public-key and the first private-key.

30. A computer program stored on a non-transitory medium, wherein the computer program when executed on a processor performs the method as claimed in claim 29.

* * * * *